(12) United States Patent
Wakao et al.

(10) Patent No.: US 9,488,140 B2
(45) Date of Patent: Nov. 8, 2016

(54) INTAKE AIR VOLUME MEASURING DEVICE FOR INTERNAL COMBUSTION ENGINE

(75) Inventors: Kazuhiro Wakao, Susono (JP); Masahiro Mori, Nagoya (JP); Takeshi Sano, Hadano (JP); Hiroshi Yamamoto, Okazaki (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 321 days.

(21) Appl. No.: 14/370,561

(22) PCT Filed: Jan. 6, 2012

(86) PCT No.: PCT/JP2012/050200
§ 371 (c)(1),
(2), (4) Date: Jul. 3, 2014

(87) PCT Pub. No.: WO2013/103018
PCT Pub. Date: Jul. 11, 2013

(65) Prior Publication Data
US 2015/0040652 A1    Feb. 12, 2015

(51) Int. Cl.
| | | |
|---|---|---|
| *F02M 35/10* | (2006.01) | |
| *F02D 41/00* | (2006.01) | |
| *F02D 41/18* | (2006.01) | |
| *G01F 1/72* | (2006.01) | |
| *G01F 15/06* | (2006.01) | |

(52) U.S. Cl.
CPC ...... *F02M 35/10386* (2013.01); *F02D 41/009* (2013.01); *F02D 41/18* (2013.01); *G01F 1/72* (2013.01); *G01F 15/068* (2013.01)

(58) Field of Classification Search
CPC ............... F02D 41/009; F02D 41/18; F02M 35/10386; G01F 15/068; G01F 1/72

USPC ........................................................ 73/114.32
See application file for complete search history.

(56) References Cited

U.S. PATENT DOCUMENTS

| | | | | |
|---|---|---|---|---|
| 7,530,347 B2* | 5/2009 | Asano | ................... | F02D 41/18 123/319 |
| 7,958,779 B2* | 6/2011 | Nagano | ............... | F02D 41/0097 73/114.15 |
| 8,521,405 B2* | 8/2013 | Maruyama | .......... | F02D 41/0085 123/690 |
| 8,965,665 B2* | 2/2015 | Iwazaki | ................ | F02D 41/008 123/672 |
| 9,249,747 B2* | 2/2016 | Matthews | ........... | F02D 41/0087 |
| 9,279,379 B2* | 3/2016 | Frampton | ........... | F02D 41/1458 |
| 9,328,685 B2* | 5/2016 | Suzuki | ................ | F02D 41/1495 |

FOREIGN PATENT DOCUMENTS

| | | |
|---|---|---|
| JP | 2004-100472 A | 4/2004 |
| JP | 2004-239104 A | 8/2004 |

(Continued)

*Primary Examiner* — Freddie Kirkland, III
(74) *Attorney, Agent, or Firm* — Andrews Kurth Kenyon LLP

(57) ABSTRACT

Disclosed is an intake air volume measuring device for an internal combustion engine. The device includes an air flow meter located in an intake air path of the internal combustion engine, to measure the volume of intake air into the combustion chamber of the internal combustion engine based on an output signal of the air flow meter. The output signal of the air flow meter (AFM signal) is sampled in synchronism with the crank angle of the internal combustion engine. With this angle-synchronous processing, the device is capable of obtaining AFM data at equal intervals within a cycle of intake air pulsation, thereby eliminating adverse effects of the intake air pulsation. The device is hence capable of reducing variations in AFM data averages and calculating average flow rates of the intake air with high precision.

6 Claims, 9 Drawing Sheets

(56) References Cited

FOREIGN PATENT DOCUMENTS

| JP | 2006-250109 A | 9/2006 |
| JP | 2007-154841 A | 6/2007 |
| JP | 2007-231840 A | 9/2007 |
| JP | 2010-168953 A | 8/2010 |

* cited by examiner

| Number of Engine Revolutions | Sampling Intervals | Number of Sets of Data Obtained |
|---|---|---|
| ~500rpm | 4msec | 15 |
| 500rpm~2000rpm | 30CA | 6 |
| 1800rpm~4000rpm | 60CA | 3 |
| 3800rpm~ | 120CA | 3 |

Equal Interval Sampling

Unequal Interval Sampling

INTAKE AIR VOLUME MEASURING DEVICE FOR INTERNAL COMBUSTION ENGINE

CROSS-REFERENCE TO RELATED APPLICATIONS

This is a national phase application based on the PCT International Patent Application No. PCT/JP2012/050200 filed Jan. 6, 2012, the entire contents of which are incorporated herein by reference.

TECHNICAL FIELD

The present invention relates in general to intake air volume measuring devices for internal combustion engines and in particular to intake air volume measuring devices that measure the intake air volume of an internal combustion engine from an output signal of an air flow meter located in an intake air path of the internal combustion engine.

BACKGROUND ART

In gasoline engines, diesel engines, and other internal combustion engines mounted to, for example, vehicles, various improvements have been made, for example, to increase engine output and reduce exhaust gas emission (e.g., NOx) by controlling multiple control quantities (e.g., amount of injected fuel) based on the measurement (intake air volume) of the volume of air sucked into the combustion chamber (i.e., into a cylinder). An air flow meter, located in an intake air path, is used to measure the intake air volume in such control (engine control) of an internal combustion engine (see, for example, Patent Document 1).

To measure an intake air volume using an air flow meter, for example, an output signal of the air flow meter is acquired and fed at predetermined time intervals (e.g., every 4 msec) (acquired and fed time-synchronously) to an ECU (electronic control device) to calculate successive averages (average flow rates of the intake air) of sampling values (hereinafter, may be referred to as AFM data) of the output signal (hereinafter, may be referred to as the AFM signal) of the air flow meter at predetermined intervals. The average flow rates of the intake air thus calculated are used to control the internal combustion engine (e.g., to control the amount of injected fuel).

CITATION LIST

Patent Literature

Patent Document 1: Japanese Patent Application Publication, Tokukai, No. 2004-239104

SUMMARY OF THE INVENTION

Problems to be Solved by the Invention

In the intake air path of the internal combustion engine, intake air pulsation can occur with air sucking steps of the cylinders. Popular up-to-date air flow meters are high-response air flow meters capable of detecting intake air volume with high precision even in a high pulsation region that can be subjected to a reverse flow.

A high-response air flow meter could register output values that vary instantly with intake air pulsations. The instantly variable output values may cause, in the time-synchronous acquisition of an AFM signal, aliasing and large variations in AFM data averages (calculated average flow rates) if the AFM signal is not acquired and fed to the ECU at suitable timings.

If the AFM signal is acquired time-synchronously at an increased frequency, the variations in the AFM data averages are reduced, but the processing workload of the ECU increases in a corresponding manner. The latter puts a limit on the high frequency acquisition.

The present invention, conceived in view of these issues, has an object to provide an intake air volume measuring device capable of obtaining average flow rates of the intake air of an internal combustion engine with high precision without being affected by intake air pulsation.

Solution to Problem

A device in accordance with the present invention is an intake air volume measuring device for an internal combustion engine and technically characterized in that: the device includes an air flow meter located in an intake air path of the internal combustion engine, to measure a volume of intake air sucked into a combustion chamber of the internal combustion engine based on an output signal of the air flow meter; and the output signal of the air flow meter is sampled in synchronism with a crank angle of the internal combustion engine, wherein an average of sets of data obtained by sampling the output signal of the air flow meter in synchronism with a crank angle of the internal combustion engine is calculated to obtain an average flow rate of the intake air, wherein the crank angle intervals, at which the output signal of the air flow meter is sampled, are switched according to the number of engine revolutions of the internal combustion engine, wherein the crank angle intervals are set to a greater value for a relatively large number of engine revolutions of the internal combustion engine than for a relatively small number of engine revolutions of the internal combustion engine, and wherein when the crank angle intervals are to be switched, if the crank angle intervals have a pre-switching value and a post-switching value such that either one of the pre-switching and post-switching values is a multiple of the other, sampling values obtained with a greater one of the pre-switching and post-switching values are used to calculate the average.

Another device in accordance with the present invention is an intake air volume measuring device for an internal combustion engine and technically characterized in that; the device includes an air flow meter located in an intake air path of the internal combustion engine, to measure a volume of intake air sucked into a combustion chamber of the internal combustion engine based on an output signal of the air flow meter; and the output signal of the air flow meter is sampled in synchronism with a crank angle of the internal combustion engine, wherein an average of sets of data obtained by sampling the output signal of the air flow meter in synchronism with a crank angle of the internal combustion engine is calculated to obtain an average flow rate of the intake air, wherein the crank angle intervals, at which the output signal of the air flow meter is sampled, are switched according to the number of engine revolutions of the internal combustion engine, wherein the crank angle intervals are set to a greater value for a relatively large number of engine revolutions of the internal combustion engine than for a relatively small number of engine revolutions of the internal combustion engine, and wherein when the crank angle intervals are to be switched, if the crank angle intervals have a pre-switching value and a post-switching value such that neither one of the ore-switching and post-switching values is a multiple of the other, a value obtained by linear interpolation from two sampling values obtained with the pre-switching value of the crank angle intervals and a sampling value obtained with the post-switching value of the crank angle intervals are used to calculate the average.

More specifically, the device is characterized in that the output signal of the air flow meter is sampled in synchronism with a crank angle of the internal combustion engine at predetermined crank angle intervals. When this is the case, the crank angle intervals are specified in agreement with an intake air pulsation cycle. Specifically, the crank angle intervals are equal to 360° divided by an integer greater than or equal to 2 and are not equal to a crank angle corresponding to a cycle of the internal combustion engine divided by the number of cylinders of the internal combustion engine.

According to the present invention, the output signal of the air flow meter (AFM signal) is sampled in synchronism with the crank angle of the internal combustion engine. The AFM signal (AFM data) is thus acquired at equal intervals within the intake air pulsation cycle, which eliminates adverse effects of intake air pulsation. That in turn reduces variations in AFM data averages and enables calculation of the average flow rates of the intake air with high precision.

According to the present invention, the crank angle intervals, at which the output signal of the air flow meter is sampled, are switched (changed) according to the number of engine revolutions of the internal combustion engine (number of engine revolutions). More specifically, the crank angle intervals are set to a greater value for a relatively large number of engine revolutions of the internal combustion engine than for a relatively small number of engine revolutions of the internal combustion engine. This arrangement prevents increases in the processing workload of the ECU when the number of engine revolutions of the internal combustion engine is relatively large.

In the present invention, when the crank angle intervals are to be switched, if the crank angle intervals have a pre-switching value and a post-switching value such that either one of the pre-switching and post-switching values is a multiple of the other, sampling values obtained with a greater one of the pre-switching and post-switching values are used to calculate AFM data average. This arrangement enables sampling of AFM data at equal intervals within a cycle of intake air pulsation upon switching the crank angle intervals (or sampling at the post-switching value of the crank angle intervals). That reduces variations in the AFM data averages (average flow rates of the intake air) upon switching the crank angle intervals.

Advantageous Effects of the Invention

According to the present invention, the output signal of the air flow meter is sampled in synchronism with the crank angle of the internal combustion engine, which eliminates adverse effects of the intake air pulsation. That in turn enables calculation of the average flow rates of the intake air with high precision.

DESCRIPTION OF EMBODIMENTS

Figure 1:
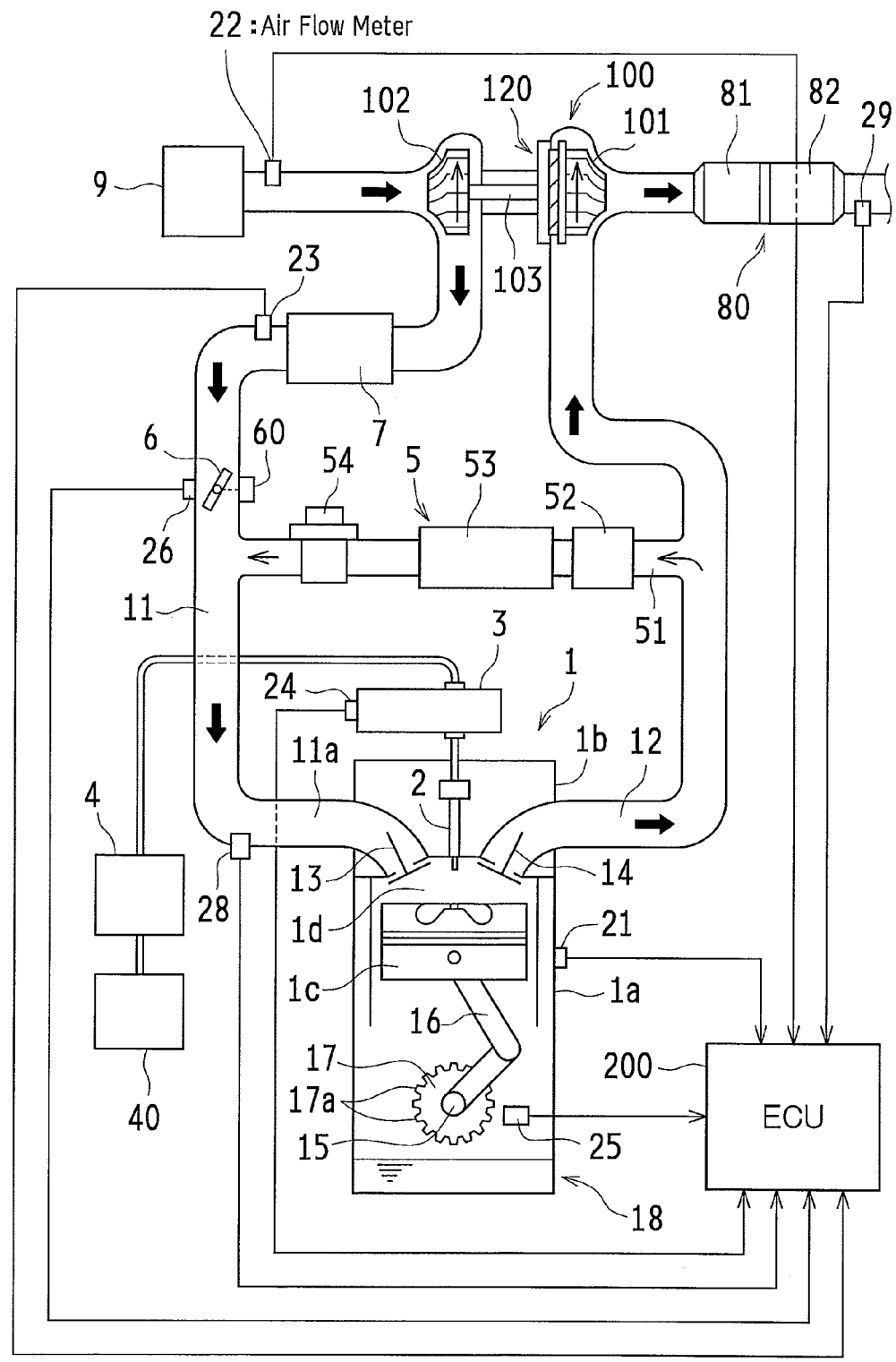
FIG. 1 is a schematic diagram of an exemplary engine (internal combustion engine) to which the present invention is applied.

The following will describe embodiments of the present invention in reference to drawings.
Engine Referring to FIG. 1, the structure of an engine (internal combustion engine) to which the present invention is applied will be briefly described. FIG. 1 shows the structure of only one of cylinders of the engine.

The engine 1 shown in FIG. 1 is a direct injection 4-cylinder diesel engine mounted to a vehicle and provided with a vertically reciprocating piston 1c in each cylinder block 1a for the cylinders. The piston 1c is coupled to a crankshaft 15 via a connecting rod 16 so that the connecting rod 16 can translate the reciprocating motion of the piston 1c to the rotation of the crankshaft 15. The crankshaft 15 of the engine 1 is coupled to a transmission (not shown) to transmit power from the engine 1 to drive wheels (not shown) of the vehicle via the transmission.

The crankshaft 15 has a signal rotor 17 attached to it. Near the side of the signal rotor 17 is there provided a crank position sensor (engine revolution count sensor) 25 detecting the crank angle. The crank position sensor 25 is, for example, an electromagnetic pickup generating a pulse signal (voltage pulses) corresponding to teeth 17a of the signal rotor 17 as the crankshaft 15 rotates. The number of engine revolutions can be calculated from an output signal of the crank position sensor 25.

A coolant temperature sensor 21 detecting the temperature of engine coolant is provided in each cylinder block 1a of the engine 1. On top of the cylinder block 1a is there provided a cylinder head 1b to form a combustion chamber 1d between the cylinder head 1b and the piston 1c.

A sump (or oil pan) 18 storing engine oil is provided on the bottom of each cylinder block 1a of the engine 1. The engine oil stored in the sump (or oil pan) 18 is pumped up by an oil pump via an oil strainer that removes foreign objects while the engine 1 is in operation. The engine oil is further purified by an oil filter before being supplied to, for example, the piston 1c, the crankshaft 15, and the connecting rod 16 for use in lubrication and cooling of these components as well as for other purposes.

The cylinder head 1b of the engine 1 is provided with an injector 2 for direct injection of fuel into the combustion chamber 1d of the engine 1. The injector 2 is connected to a common rail (accumulator) 3. The fuel within the common rail 3 is injected from the injector 2 into the combustion chamber 1d when the valve of the injector 2 is open.

The common rail 3 is provided with a rail pressure sensor 24 detecting the pressure (rail pressure) of high pressure fuel inside the common rail 3. The common rail 3 is connected to a supply pump, or a fuel pump, 4.

The supply pump 4 is driven by the rotational force of the crankshaft 15 of the engine 1. In each cylinder of the engine 1, the fuel is injected into the combustion chamber 1d as the supply pump 4, thus driven, supplies fuel from a fuel tank 40 to the common rail 3, and the valve of the injector 2 is opened at a predetermined timing. The injected fuel is combusted in the combustion chamber 1d with resultant exhaust gas being vented. The valve opening timing (injection period) for the injector 2 is controlled by an ECU (electronic control unit) 200 (detailed later).

The combustion chamber 1d of the engine 1 is connected to an intake air path 11 and an exhaust air path 12. An intake air valve 13 is provided between the intake air path 11 and the combustion chamber 1d. By driving the intake air valve 13 to open and close, the intake air path 11 and the combustion chamber 1d communicate with, and separate from, each other.

An exhaust air valve 14 is provided between the exhaust air path 12 and the combustion chamber 1d. By driving the exhaust air valve 14 to open and close, the exhaust air path 12 and the combustion chamber 1d communicate with, and separate from, each other. These intake air valve 13 and exhaust air valve 14 are driven to open and close by the rotation of an intake air camshaft and an exhaust air camshaft to which the rotation of the crankshaft 15 is transmitted.

The intake air path 11 is provided with, for example, an air cleaner 9, an air flow meter 22 detecting intake air volume (fresh air volume), a compressor impeller 102 for a turbocharger 100 (detailed later), an intercooler 7 for forced cooling of intake air the temperature of which has elevated due to supercharging by the turbocharger 100, an intake air temperature sensor 23, a throttle valve 6, and an intake manifold pressure sensor (supercharging pressure sensor) 28 detecting pressure (supercharging pressure) inside the intake manifold 11a.

In the present embodiment, the air flow meter 22 is a high-response air flow meter capable of detecting intake air volume with high precision even in a high pulsation region that can be subjected to a reverse flow (that may result from combustion gas flowing backward from the combustion chamber to the intake air path).

The throttle valve 6 is located in the intake air path 11 which is located downstream (with respect to the intake air flow) from the intercooler 7 (compressor impeller 102 of the turbocharger 100). The throttle valve 6 is an electronically controlled valve. The opening degree (throttle opening degree) of the throttle valve 6 is regulated by a throttle motor 60 and detected by a throttle opening degree sensor 26. The throttle valve 6 in this example is electronically controllable in terms of throttle opening degree independently from the operation of an accelerator pedal by the driver.

The exhaust air path 12 is provided with a maniverter (exhaust gas cleaner) 80 containing a NOx storage catalyst (NSR catalyst: NOx storage reduction catalyst) 81 and a DPNR catalyst (diesel particulate-NOx reduction catalyst) 82. The exhaust air path 12 is further provided with an A/F sensor (air-to-fuel ratio sensor) 29 which is located downstream from the maniverter 80.

Turbocharger

The engine 1 is equipped with a turbocharger (supercharger) 100 supercharging intake air by means of exhaust air pressure.

The turbocharger 100, as illustrated in FIG. 1, is composed of, for example, a turbine wheel 101 located in the exhaust air path 12, a compressor impeller 102 located in the intake air path 11, and a coupling shaft 103 integrally coupling the turbine wheel 101 and the compressor impeller 102. The energy of exhaust air rotates the turbine wheel 101 located in the exhaust air path 12, which in turn rotates the compressor impeller 102 located in the intake air path 11. The rotation of the compressor impeller 102 supercharges intake air. The supercharged air is forced into the combustion chamber in each cylinder of the engine 1.

The turbocharger 100 in this example is a variable nozzle turbocharger (VNT) provided with a variable nozzle vane mechanism 120 near the turbine wheel 101. The supercharging pressure of the engine 1 is adjusted by regulating the opening degree of the variable nozzle vane mechanism 120 (hereinafter, may be referred to as a VN opening degree).

EGR Device

The engine 1 is equipped with an EGR (exhaust gas recirculation) device 5 that reduces the generation of NOx by introducing part of exhaust gas into intake air to lower the combustion temperature inside the combustion chamber 1d.

The EGR device 5, as illustrated in FIG. 1, is composed of, for example, an EGR path 51, an EGR catalyst (e.g., oxidation catalyst) 52 contained in the EGR path 51, an EGR cooler 53, and an EGR valve 54. The EGR path 51 is in communication with an exhaust air path 12 located upstream (with respect to the exhaust gas flow) from the turbine wheel 101 of the turbocharger 100 and also with an intake air path 11 located downstream (with respect to the intake air flow) from the intercooler 7 (compressor impeller 102 of the turbocharger 100). By regulating the opening degree of the EGR valve 54 in the EGR device 5 thus structured, the EGR ratio [=EGR volume/(EGR volume+intake air volume (fresh air volume)) (%)] can be changed. That in turn enables regulation of the EGR volume (exhaust gas recirculation volume) introduced from the exhaust air path 12 to the intake air path 11.

The EGR device 5 may be provided with an EGR bypass path and an EGR bypass switching valve for bypassing the EGR cooler 53.

ECU

Figure 2:
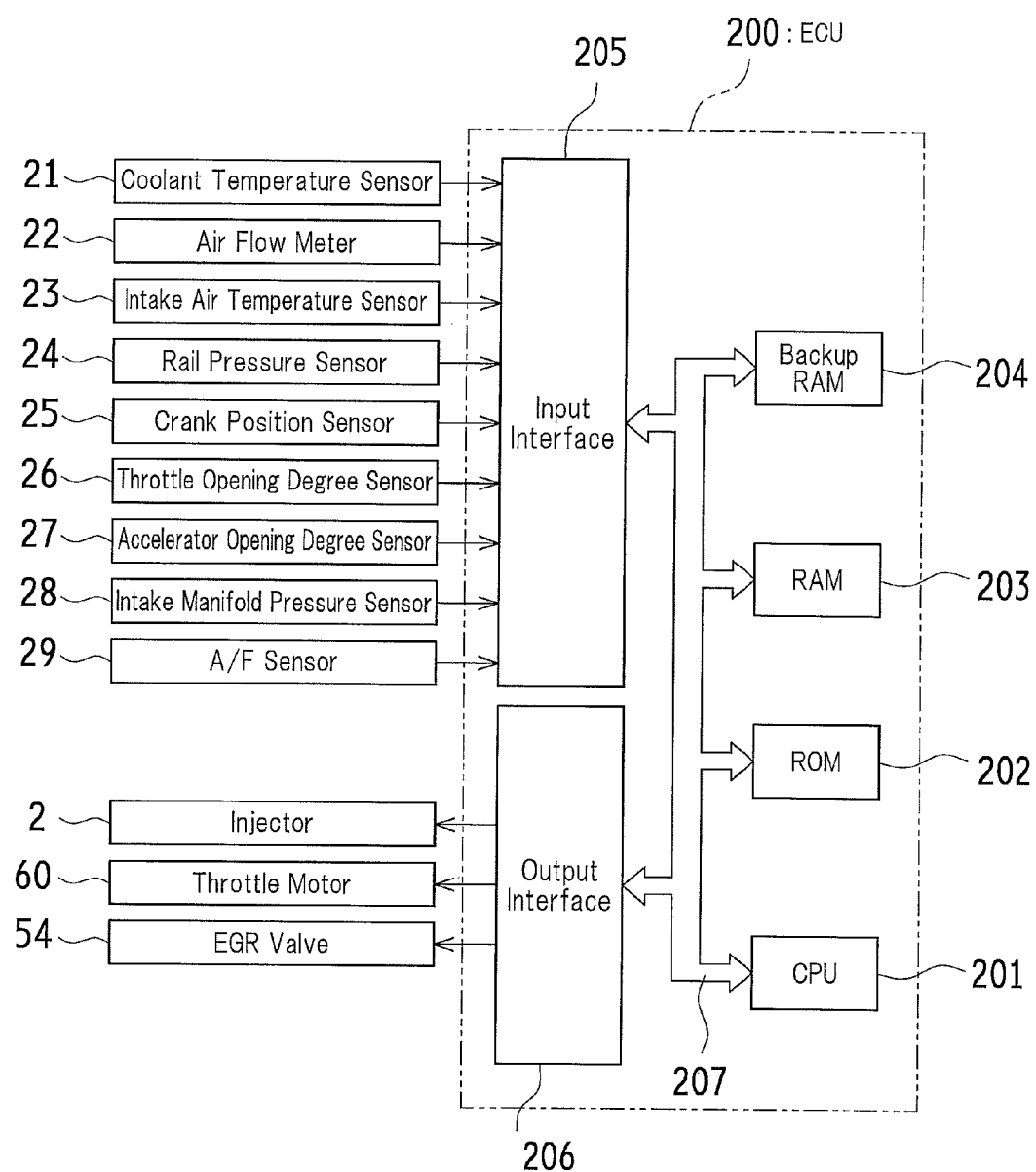
FIG. 2 is a block diagram of the configuration of a control system including an ECU.

The ECU 200, as illustrated in FIG. 2, includes, for example, a CPU (central processing unit) 201, a ROM (read-only memory) 202, a RAM (random access memory) 203, and a backup RAM 204.

The ROM 202 stores, for example, various control programs and maps that are referred to when the various control programs are executed. The CPU 201 executes various computation based on the various control programs and maps stored in the ROM 202. The RAM 203 is a memory for temporary storage of, for example, results of computations by the CPU and data inputs from sensors. The backup RAM 204 is a non-volatile memory for storage of, for example, data that needs to be backed up before the engine 1 is stopped.

The CPU 201, ROM 202, RAM 203, and backup RAM 204 are connected to each other, as well as to an input interface 205 and an output interface 206, via a bus 207.

The input interface 205 is provided with, for example, a buffer for temporary storage of data, a waveform generating circuit, and an A/D converter. In the present embodiment, the buffer may include, for example, a 30-CA buffer, a 60-CA buffer, a 90-CA buffer, and a 120-CA buffer for temporary storage of the AFM data obtained at sampling intervals (detailed later: e.g., 30-CA intervals, 60-CA intervals, 90-CA intervals, and 120-CA intervals).

The input interface 205 is connected to, for example, the coolant temperature sensor 21, the air flow meter 22, the intake air temperature sensor 23, the rail pressure sensor 24, the crank position sensor 25, the throttle opening degree sensor 26 detecting the opening degree of the throttle valve 6, an accelerator opening degree sensor 27 detecting the depression amount (accelerator opening degree) of the accelerator pedal, the intake manifold pressure sensor (supercharging pressure sensor) 28, and the A/F sensor 29.

The output interface 206 is connected to, for example, the injector 2, the throttle motor 60 for the throttle valve 6, and the EGR valve 54.

The ECU 200 implements various control of the engine 1 based on output signals of the various sensors mentioned above, including opening degree control for the throttle valve 6 of the engine 1, fuel injection amount and period control (open/close control for the injector 2), and EGR control.

The ECU 200 further implements an AFM data obtaining process and an average flow rate calculating process described below. The calculated average flow rates calculated by these processes are used to control the engine 1 (in the fuel injection amount control, the EGR control, etc.).

The intake air volume measuring device of the present invention is realized primarily by the air flow meter 22 and the ECU 200. AFM data obtaining process and average flow rate calculating process Next will be described the AFM data obtaining process and the average flow rate calculating process as implemented by the ECU 200.

As mentioned earlier, the high-response air flow meter 22 could register output values that vary instantly with intake air pulsations in intake air volume measurement. The instantly variable output values may cause, in the time-synchronous acquisition of an AFM signal, large variations in AFM data averages (calculated average flow rates) if the AFM signal is not acquired and fed to the ECU 200 at suitable timings. For example, if the sampling cycle (e.g., 4 msec) matches the peaks of the intake air pulsations (pulsation cycle), the AFM data averages increase; if the sampling cycle matches the troughs of the intake air pulsations (pulsation cycle), the AFM data averages decrease. Large variations in the AFM data averages (calculated average flow rates) may occur, as in this example, depending on the timings at which the AFM signal is acquired and fed to the ECU 200. In addition, errors (aliasing) in the AFM data averages may occur in time-synchronous acquisition of the AFM signal.

The variations and errors in the calculated average flow rates inhibit optimal AFM signal-based control (fuel injection amount control, EGR control, etc.), causing potential degradation of fuel consumption ratio (fuel economy) and exhaust gas emission. Furthermore, the variations in the calculated average flow rates may cause variations (e.g., hunting) in AFM signal-based control (fuel injection amount control, EGR control, etc.) and could degrade drivability.

The variations in the calculated average flow rates may be reduced by subjecting the calculated average flow rates to moderation. Moderated, AFM signal-based control (fuel injection amount control, EGR control, etc.), however, would not be comparable to non-moderated control in response, hence in overall performance.

If the AFM signal is acquired time-synchronously at an increased frequency, the variations in the AFM data averages are reduced, but the processing workload of the ECU increases. The acquisition frequency can therefore be increased only in a limited manner. The same problem occurs if the AFM signal is a pulse (frequency) signal.

Accordingly, in the present embodiment, to eliminate the aforementioned adverse effects of the intake air pulsations (variations in the AFM data averages (calculated average flow rates)), processes are carried out at an angular cycle equal to the pulsation cycle of intake air pulsation, and the output signal (AFM signal) of the air flow meter 22 is sampled at equal intervals within a cycle of intake air pulsation to calculate the average flow rates of the intake air. The following will describe a specific example of the processes (the AFM data obtaining process and the average flow rate calculating process).

AFM Data Obtaining Process

First, an exemplary AFM data obtaining process will be described in reference to the flow chart in FIG. 3. The process routine shown in FIG. 3 is implemented repeatedly at predetermined time intervals (e.g., every 4 msec) by the ECU 200.

Figures 3, 4:
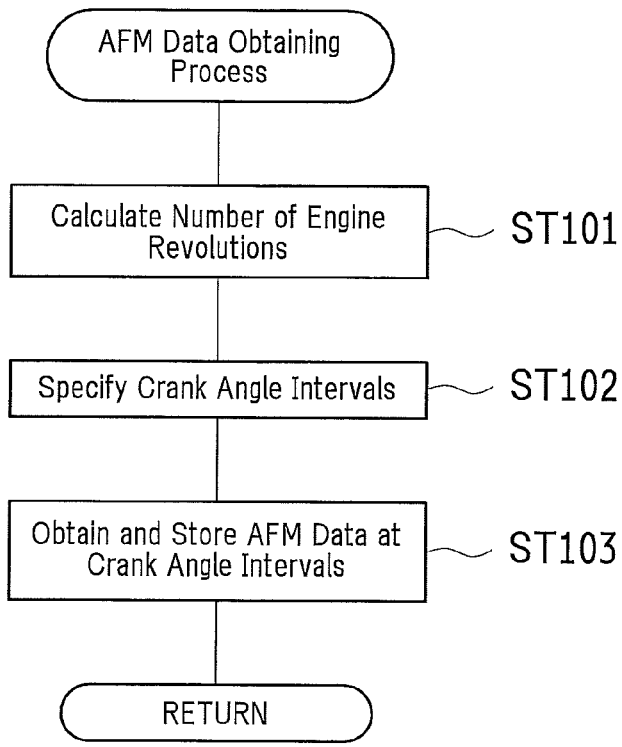
FIG. 3 is a flow chart depicting an exemplary AFM data obtaining process as implemented by the ECU.
FIG. 4 is a diagram representing an exemplary map for use in specifying a crank angle interval at which an AFM signal is sampled.

As the process routine in FIG. 3 is started, the number of engine revolutions is calculated from the output signal of the crank position sensor 25 in step ST101.

Next, in step ST102, crank angle intervals (at which the output signal of the air flow meter 22 is to be sampled: e.g., 30 CA, 60 CA, 90 CA, and 120 CA) are specified based on the number of engine revolutions calculated in step ST101 in reference to the map in FIG. 4. How the crank angle intervals are specified will be detailed later.

Then, in step ST103, based on the output signal of the crank position sensor 25, the output signal (AFM signal) of the air flow meter 22 is sampled at the crank angle intervals (30 CA, 60 CA, 90 CA, or 120 CA) specified in step ST102, and the AFM data thus sampled is (temporarily) stored in a buffer in the ECU 200.

Specifying Crank Angle Intervals

Next will be described a process of specifying crank angle intervals at which the output signal of the air flow meter 22 is sampled.

The crank angle intervals used in this example are equal to 360° divided by an integer greater than or equal to 2 (this condition is termed condition J1). The angle (crank angle) of 360° corresponds to one revolution of the crankshaft 15 of the engine 1.

For example, when the integer greater than or equal to 2 is equal to 12, the crank angle intervals are set to 30° (hereinafter, may be referred to as 30-CA intervals); when the integer greater than or equal to 2 is equal to 6, the crank angle intervals are set to 60° (hereinafter, may be referred to as 60-CA intervals); when the integer greater than or equal to 2 is equal to 4, the crank angle intervals are set to 90° (hereinafter, may be referred to as 90-CA intervals); and when the integer greater than or equal to 2 is equal to 3, the crank angle intervals are set to 120° (hereinafter, may be referred to as 120-CA intervals).

In any cases, the crank angle intervals are not equal to a crank angle for a cycle of the engine 1 (=720°) divided by the number of cylinders (i.e., 720°/Number of cylinders). This condition is termed condition J2. For example, if the engine 1 is a 4-cylinder engine, the crank angle intervals are not equal to 180°. This exclusion of the value equal to the crank angle for one cycle (=720°) divided by the number of cylinders is due to the following reasons.

The intake air pulsations described above occur in agreement with the air sucking steps of each cylinder of the engine 1. For example, for a 4-cylinder engine, four intake air pulsations (four pulsation cycles) occur in a single engine cycle (=720°). The intake air pulsation cycle for each cylinder is therefore equivalent to 180° (180 CA). If the crank angle intervals at which the output signal of the air flow meter 22 is sampled are set to 180 CA for the 4-cylinder engine 1, the sampling cycle matches the intake air pulsation cycle; the output signal may be sampled, for example, only when the intake air pulsation is at its peak value (AFM data) in each pulsation cycle. In other cases, conversely, the output signal may be sampled only when the intake air pulsation is at its trough value (AFM data) in each pulsation cycle. These phenomena hinder accurate calculation of AFM data averages. This is prevented from happening in this example by excluding the angle corresponding to one cycle (720 CA) divided by the number of cylinders (720°/Number of cylinders).

In addition, in this example, the crank angle intervals at which the AFM signal is acquired are switchable according to the number of engine revolutions of the engine 1. Specifically, the crank angle intervals at which AFM signal is acquired are set to a greater value for a relatively large number of engine revolutions than for a relatively small number of engine revolutions.

In this example, a predetermined map (table) shown in FIG. 4 is provided in accordance with the conditions above (conditions J1 and J2). The crank angle intervals at which the output signal (AFM signal) of the air flow meter 22 is acquired (hereinafter, may be referred to as the sampling intervals) are specified based on the number of engine revolutions calculated from the output signal of the crank position sensor 25 in reference to the map in FIG. 4. Specifically, if the number of engine revolutions is from 500 rpm to 2000 rpm, the sampling intervals are set to 30 CA; if the number of engine revolutions is from 1800 rpm to 4000 rpm, the sampling intervals are set to 60 CA; and if the number of engine revolutions is greater than or equal to 3800 rpm, the sampling intervals are set to 120 CA. The map shown in FIG. 4 is stored in the ROM 202 in the ECU 200.

In the map shown in FIG. 4, an overlapping revolution region (1800 rpm to 2000 rpm) is provided where there exists an overlap of the number of engine revolutions for the 30-CA interval and the number of engine revolutions for the 60-CA interval. This is intended to give hysteresis to the switching value (for the number of engine revolutions) at which the sampling intervals are switched from 30 CA to 60 CA while the number of engine revolutions is rising and the switching value (for the number of engine revolutions) at which the sampling intervals are switched from 60 CA to 30 CA while the number of engine revolutions is falling.

Specifically, if the number of engine revolutions is rising, the sampling intervals are switched from 30 CA to 60 CA when the rising number of engine revolutions have reached 2000 rpm. Meanwhile, if the number of engine revolutions is falling, the sampling intervals are switched from 60 CA to 30 CA when the falling number of engine revolutions have reached 1800 rpm.

Hysteresis is also given to the switchings between 60 CA and 120 CA for the rising and falling numbers of engine revolutions. More particularly, if the number of engine revolutions is rising, the sampling intervals are switched from 60 CA to 120 CA when the rising number of engine revolutions has reached 4000 rpm. Meanwhile, if the number of engine revolutions is falling, the sampling intervals are switched from 120 CA to 60 CA when the falling number of engine revolutions has reached 3800 rpm.

In the map shown in FIG. 4, the AFM signal sampling intervals are set to 4 msec (time-synchronous) in a low revolution region where the number of engine revolutions is less than 500 rpm for the following reasons. If the sampling intervals are set to 30 CA in the <500 rpm, low revolution region, the AFM signal sampling period is too long to calculate the AFM data averages with sufficient precision. This is prevented from happening by sampling the AFM signal time-synchronously (every 4 msec) when the number of engine revolutions is less than 500 rpm.

In addition, the AFM signal is angle-synchronously sampled in the revolution regions where the number of engine revolutions is greater than or equal to 500 rpm. This particular design is problem free because the AFM data is unfailingly obtained at the crank angle intervals when the engine 1 is in operation (including when the engine 1 is idling).

Figure 8:
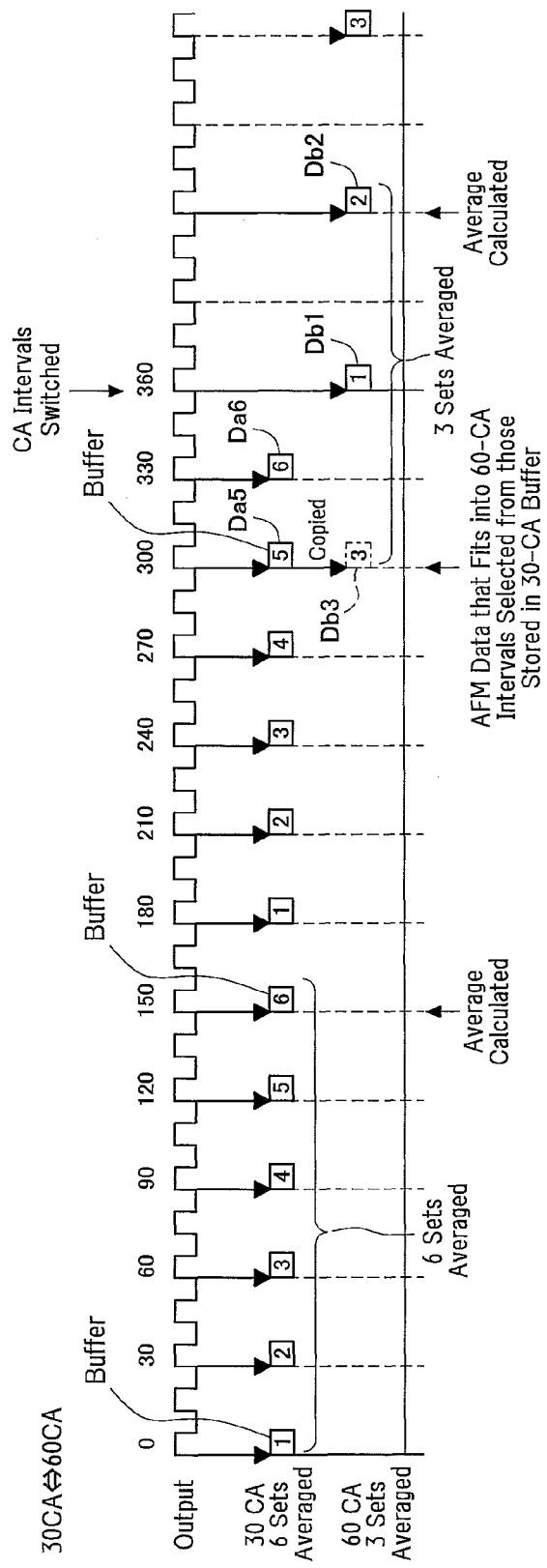
FIG. 8 is a schematic illustration showing an exemplary AFM data average calculating process in switching the crank angle interval.

In this example, if the crank angle intervals specified in step ST102 of the process routine shown in FIG. 3 are, for example, 30 CA, the AFM data is obtained and stored into the 30-CA buffer in the ECU 200 at 30-CA intervals (see FIG. 8). When the number of engine revolutions has risen to 2000 rpm from this condition, the crank angle intervals at which the AFM data is obtained are switched from 30 CA to 60 CA (see FIG. 8) to obtain and store the AFM data into the 60-CA buffer in the ECU 200 at 60-CA intervals (see FIG. 8). When the number of engine revolutions has risen to 4000 rpm, the crank angle intervals at which the AFM data is obtained are switched from 60 CA to 120 CA to obtain and store the AFM data into the 120-CA buffer in the ECU 200 at 120-CA intervals.

Meanwhile, starting from the condition where the AFM data is obtained at 120-CA intervals, when the number of engine revolutions has fallen and reached 3800 rpm, the crank angle intervals are switched from 120 CA to 60 CA to obtain and store the AFM data into the 60-CA buffer in the ECU 200 at 60-CA intervals. When the number of engine revolutions has further fallen and reached 1800 rpm, the crank angle intervals are switched from 60 CA to 30 CA to obtain and store the AFM data into the 30-CA buffer of the ECU 200 at 30-CA intervals.

The map shown in FIG. 4 is a mere example where the crank angle intervals at which the output signal (AFM signal) of the air flow meter 22 is sampled are set to 30 CA, 60 CA, or 120 CA. As another example, the crank angle intervals at which the AFM signal is sampled may be set to 30 CA, 60 CA, 90 CA, or 120 CA. Furthermore, the crank angle intervals may be set to any other value provided that conditions J1 and J2 are met.

Average Flow Rate Calculating Process

Next will be described a process for calculating an average (average flow rate of intake air) of the AFM data obtained in the AFM data obtaining process in reference to the flow chart in FIG. 5. The process routine in FIG. 5 is repeatedly implemented by the ECU 200 at predetermined intervals (e.g., every 16 msec).

Figure 5:
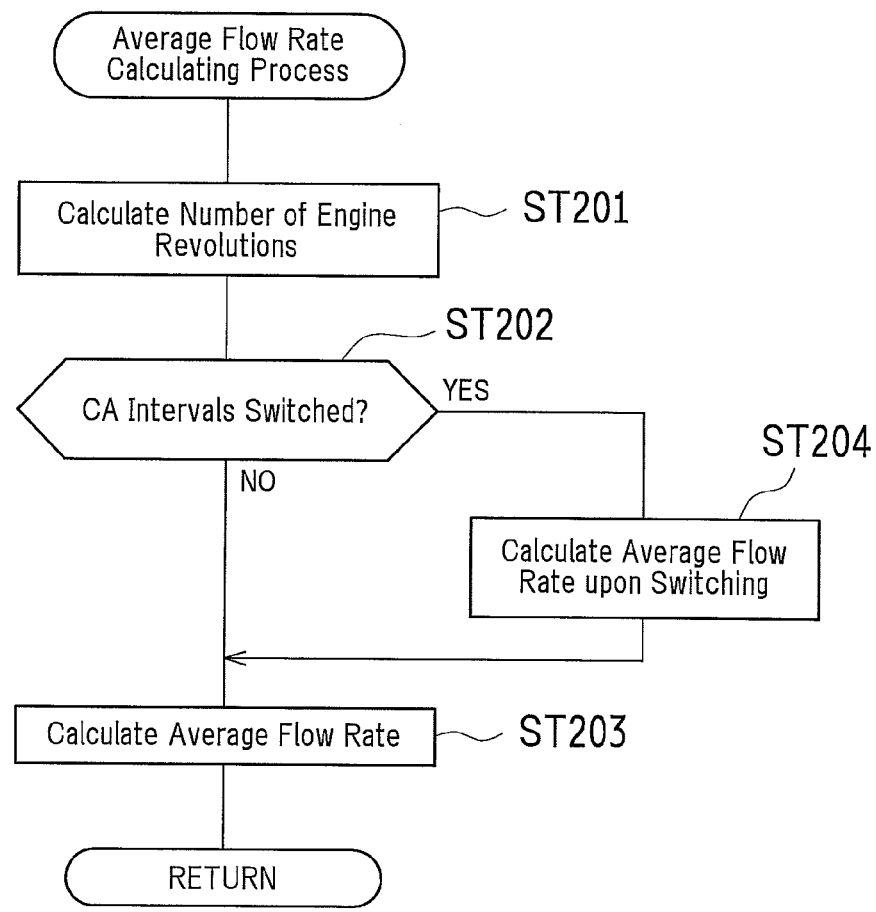
FIG. 5 is a flow chart depicting an exemplary average flow rate calculating process as implemented by the ECU.

As the process routine in FIG. 5 is started, the number of engine revolutions is calculated from the output signal of the crank position sensor 25 in step ST201.

In step ST202, it is determined from the number of engine revolutions calculated in step ST201 whether or not the crank angle intervals (CA intervals) have been switched.

Specifically, for example, while the number of engine revolutions is rising, if the number of engine revolutions for the previous routine is less than 2000 rpm (greater than or equal to 500 rpm), and the number of engine revolutions for the current routine is also less than 2000 rpm (greater than or equal to 500 rpm), it is determined that no CA interval switching has occurred ("NO" in step ST202), and the process proceeds to step ST203. Meanwhile, while the number of engine revolutions is rising, if the number of engine revolutions for the previous routine is less than 2000 rpm (greater than or equal to 500 rpm), and the number of engine revolutions for the current routine is greater than or equal to 2000 rpm, it is determined that a CA interval switching from 30 CA to 60 CA has occurred ("YES" in step ST202), and the process proceeds to step ST204.

While, for example, the number of engine revolutions is falling, if the number of engine revolutions for the previous routine is greater than 3800 rpm, and the number of engine revolutions for the current routine is also greater than 3800 rpm, it is determined that no CA interval switch has occurred, and the process proceeds to step ST203. Meanwhile, while the number of engine revolutions is falling, if the number of engine revolutions for the previous routine is greater than 3800 rpm, and the number of engine revolutions for the current routine is less than or equal to 3800 rpm, it is determined that a CA interval switching from 120 CA to 60 CA has occurred, and the process proceeds to step ST204.

In step ST203, the AFM data obtained in the AFM data obtaining process is averaged to calculate an average flow rate of intake air. This average flow rate calculating process will be detailed later.

In step ST204, an average flow rate upon switching is calculated. Step ST204 is carried out upon switching the crank angle intervals. After step ST204 is completed, (after the average flow rate calculating process for a cycle of intake air pulsation upon switching the CA intervals is completed), the process proceeds to step ST203, and the average flow rate calculating process is repeated. Step ST204 (average flow rate calculating process upon switching) will be detailed later.

Average Flow Rate Calculating Process

Next will be described the average flow rate calculating process implemented in step ST203 in FIG. 5.

In the present embodiment, since processes are carried out at an angular cycle equal to the pulsation cycle of intake air pulsation to eliminate the adverse effects of the intake air pulsations as described above, the averaging period over which an AFM data average is calculated is equal to a crank angle for a cycle of the engine 1 (=720°) divided by the number of cylinders (period corresponding to a cycle of intake air pulsation).

Specifically, if the engine 1 is a 4-cylinder engine, the averaging period is 180°, and there are six (=180°/30°) sets of data obtained for 30-CA crank angle intervals (see FIG. 4); under the same conditions, the averaging period is 180°, and there are three (=180°/60°) sets of data obtained for 60-CA crank angle intervals (see FIG. 4); and under the same conditions, the averaging period is 180°, and there are two (=180°/90°) sets of data obtained for 90-CA crank angle intervals (see FIG. 4). For 120-CA crank angle intervals, there is a single set of data obtained, and no average can be calculated. Therefore, for 120-CA intervals, the averaging period is 360°, which is a multiple of 180°, and there are three sets of data obtained (see FIG. 4).

In step ST203, the AFM data stored in the buffer in the AFM data obtaining process is checked, a sum of multiple sets of AFM data is calculated, and the calculated sum of AFM data is divided by the number of sets of data to calculate an AFM data average, i.e., an average flow rate of intake air.

Specifically, for example, for 30-CA crank angle intervals, as illustrated in FIG. 8, it is checked whether or not the AFM data obtained in the AFM data obtaining process has been stored in six 30-CA buffers. The sum of the six sets of AFM data is calculated, and the calculated sum of AFM data is divided by 6 to calculate an average flow rate of intake air. This calculation process is repeatedly implemented as long as the result of determination in step ST202 is "NO" (no CA interval switching has occurred). On the other hand, if the result of determination in step ST202 is "YES," step ST204 (an average flow rate calculating process upon switching) is implemented before the process proceeds to step ST203.

Figure 10:
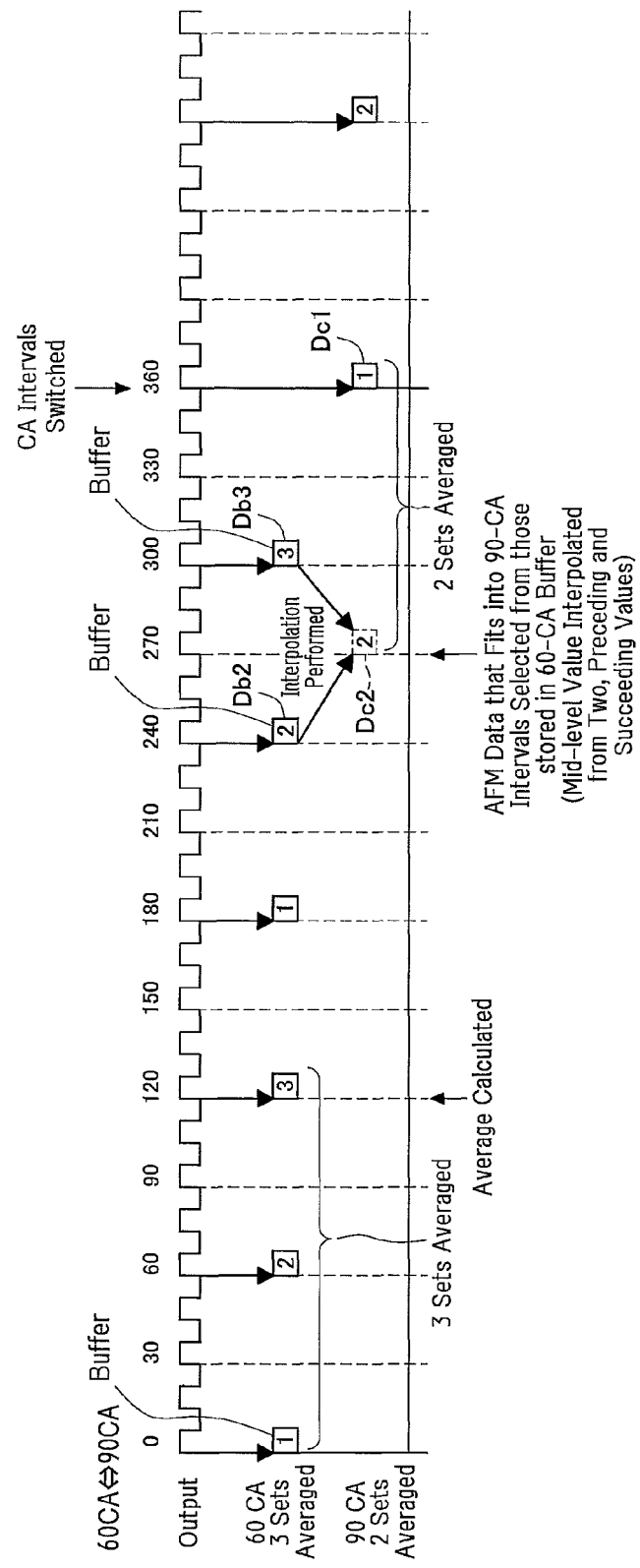
FIG. 10 is a schematic illustration showing another exemplary AFM data average calculating process in switching the crank angle interval.

An average flow rate of intake air is calculated similarly for 60-CA, 90-CA, and 120-CA crank angle intervals. Specifically, as illustrated in FIG. 10, three sets of AMF data are averaged to calculate an average flow rate of intake air for 60-CA crank angle intervals; for 90-CA crank angle intervals, two sets of AMF data are averaged to calculate an average flow rate of intake air; and for 120-CA crank angle intervals, three sets of AMF data are averaged to calculate an average flow rate of intake air.

Average Flow Rate Calculating Process Upon Switching

Next will be described an average flow rate calculating process upon switching implemented in step ST204 in FIG. 5.

A switching of the crank angle intervals at which the AFM signal is acquired causes samplings to be carried out at unequal intervals within the cycle of intake air pulsation in which the switching occurs, leading to variations in AFM data averages. The following will describe these phenomena in two cases, one where either one of the pre-switching and post-switching crank angle intervals (CA intervals) is a multiple of the other and another where neither one of the pre-switching and post-switching crank angle intervals (CA intervals) is a multiple of the other.

Either One of Pre-Switching and Post-Switching CA Intervals is a Multiple of the Other Referring to FIG. 6, a case will be described where either one of the pre-switching and post-switching crank angle intervals is a multiple of the other (the crank angle intervals are switched from 30 CA to 60 CA).

Figure 6:
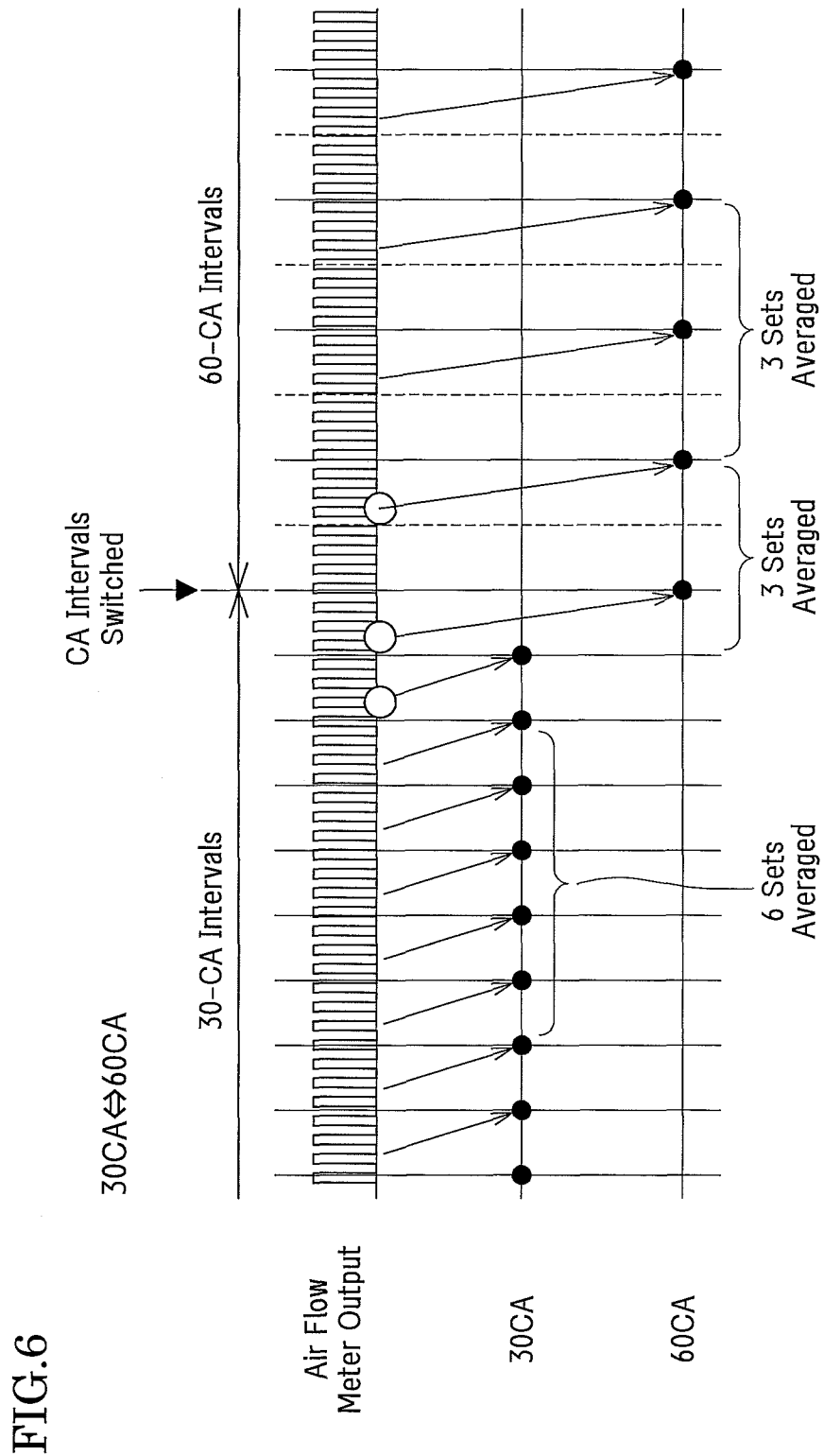
FIG. 6 is an illustration showing problems in switching the crank angle interval.
Figure 7:
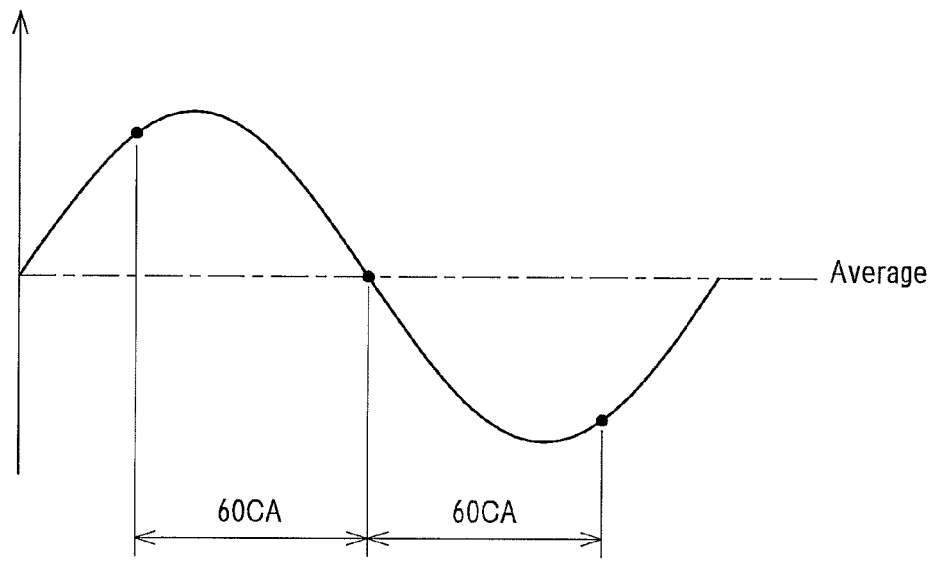
FIG. 7 is a diagram showing problems in switching the crank angle interval.
Figure 7:
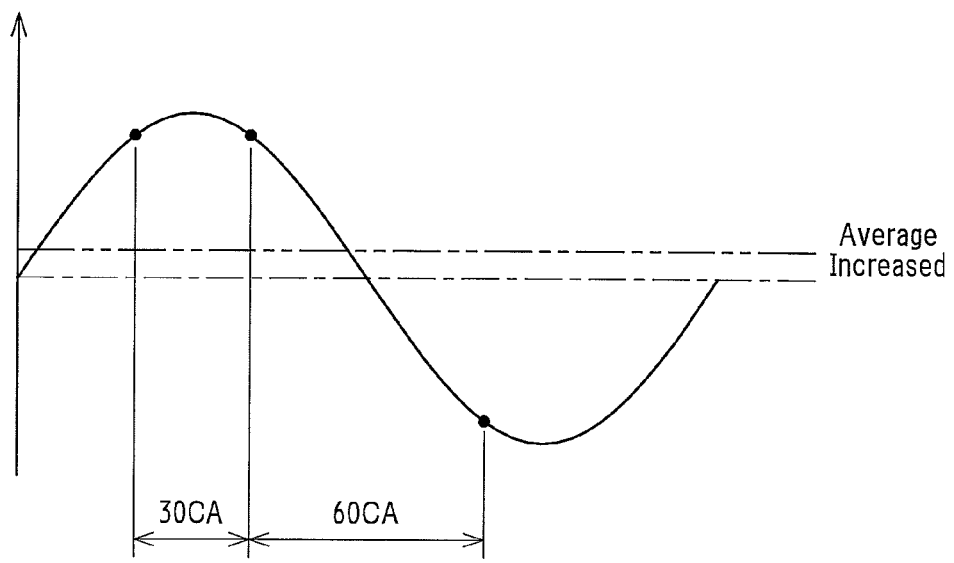

As illustrated in FIG. 6, when the crank angle intervals are switched from 30 CA to 60 CA, the AFM data obtained at 30-CA intervals and the AFM data obtained at 60-CA intervals exist together within a cycle of intake air pulsation. Therefore, as illustrated in FIG. 7, data samplings are carried out at unequal intervals within that cycle of intake air pulsation. As the crank angle intervals are switched, the AFM data averages may temporarily vary (e.g., the averages may become greater than for equal intervals as illustrated in FIG. 7), with the variations in the averages possibly acting as noise.

The AFM data averages may vary for similar reasons when the crank angle intervals are switched from 60 CA to 120 CA. The AFM data averages may vary again for similar reasons, for example, when the crank angle intervals are switched from 120 CA to 60 CA while the number of engine revolutions is falling and when the crank angle intervals are switched from 60 CA to 30 CA while the number of engine revolutions is falling.

Average Calculating Process

Example 1

Referring to FIG. 8, a process (average flow rate calculating process upon switching) will be described that eliminates variations in AFM data averages upon switching the CA intervals. FIG. 8 represents an exemplary case where the crank angle intervals are switched from 30 CA to 60 CA.

If no crank angle interval switching has occurred, and AFM data is obtained at 30-CA intervals in the AFM data obtaining process, the obtained AFM data is stored one set after the other into the 30-CA buffer in the ECU 200 at 30-CA intervals. Six sets of AFM data are used to calculate an average.

Next, as the number of engine revolutions rises, and the crank angle intervals are switched from 30 CA to 60 CA, variations could occur in the AFM data averages as mentioned earlier if the AFM data [Da6] in the 30-CA buffer and the AFM data [Db1] and [Db2] in the 60-CA buffer are used to calculate an average.

Accordingly, in this example, the AFM data [Da5], which fits into the 60-CA intervals, is selected from the AFM data obtained at 30-CA intervals. The selected AFM data [Da5] is copied to the 60-CA buffer for use as AFM data [Db3] obtained at 60-CA intervals. An average is then calculated from the copied AFM data [Db3] and the AFM data [Db1] and [Db2] obtained at 60-CA intervals. This process, when carried out upon switching from 30 CA to 60 CA, renders equal to each other the sampling intervals within a cycle of intake air pulsation in which the CA switching occurs. The process eliminates variations in AFM data averages. This average flow rate calculating process for a CA interval switching is implemented only in the cycle of intake air pulsation in which the switching occurs.

The process for calculating an AFM data average from the AFM data [Da5] which fits into the 60-CA intervals is an equivalent of "if the crank angle intervals have a pre-switching value and a post-switching value such that either one of the pre-switching and post-switching values is a multiple of the other, sampling values obtained with a greater one of the pre-switching and post-switching values are used to calculate an average" in accordance with the present invention.

A similar process eliminates variations in AFM data averages, for example, when the crank angle intervals are switched from 60 CA to 120 CA, when the crank angle intervals are switched from 120 CA to 60 CA, and when the crank angle intervals are switched from 60 CA to 30 CA.

Neither One of Pre-Switching and Post-Switching CA Intervals is a Multiple of the Other Referring to FIG. 9, a case will be described where neither one of the pre-switching and post-switching crank angle intervals is a multiple of the other (the crank angle intervals are switched from 60 CA to 90 CA).

Figure 9:
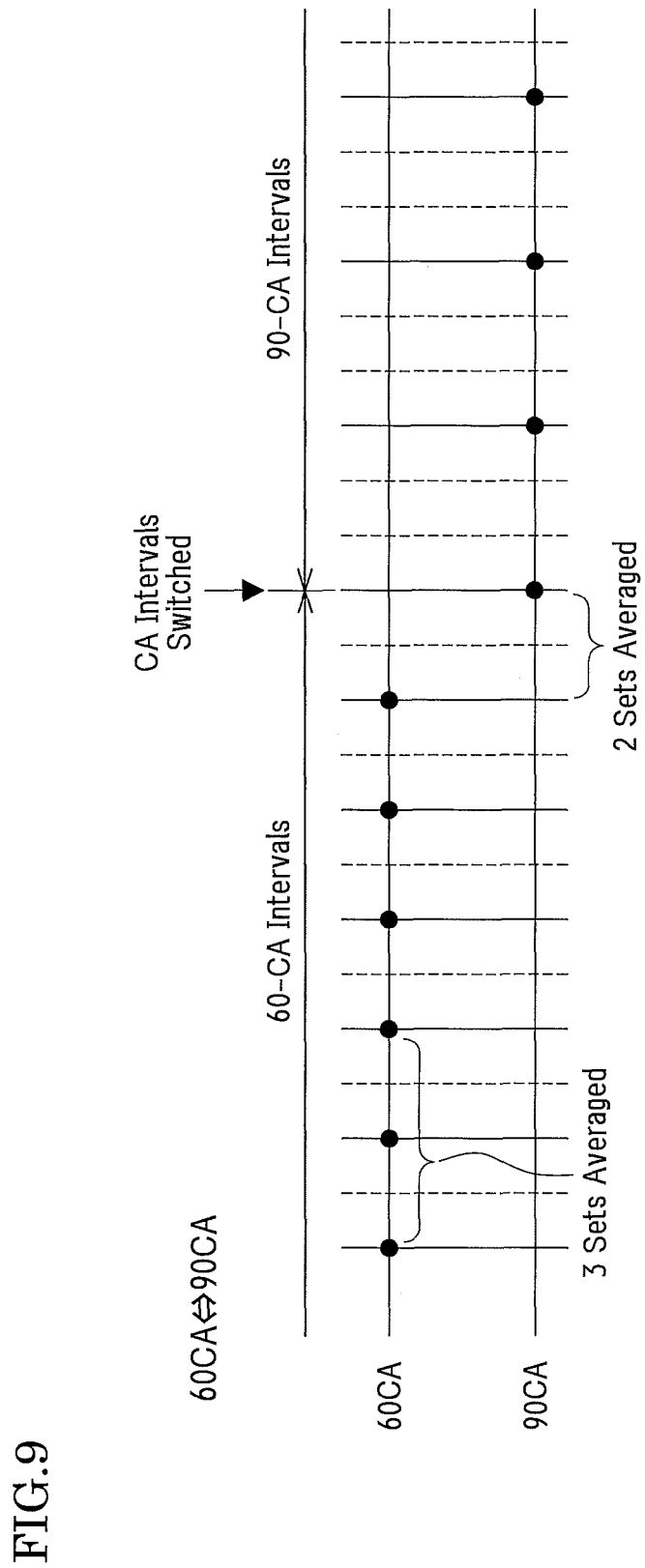
FIG. 9 is an illustration showing problems in switching the crank angle interval.

As illustrated in FIG. 9, when the crank angle intervals are switched from 60 CA to 90 CA, the AFM data obtained at 60-CA intervals and the AFM data obtained at 90-CA intervals exist together within a cycle of intake air pulsation. Therefore, an AFM data average is calculated from two sets of AFM data obtained at 60-CA intervals despite that the crank angle intervals have been switched to 90 CA. In that case, as the crank angle intervals are switched, the AFM data averages may again temporarily vary, with the variations in the averages possibly acting as noise.

The AFM data averages may vary for similar reasons when the crank angle intervals are switched from 90 CA to 120 CA. The AFM data averages may vary again for similar reasons, for example, when the crank angle intervals are switched from 120 CA to 90 CA while the number of engine revolutions is falling and when the crank angle intervals are switched from 90 CA to 60 CA while the number of engine revolutions is falling.

Average Calculating Process

Example 2

Referring to FIG. 10, a process (average flow rate calculating process upon switching) will be described that eliminates variations in AFM data averages upon switching the CA intervals. FIG. 10 represents an exemplary case where the crank angle intervals are switched from 60 CA to 90 CA.

If no crank angle interval switching has occurred, and AFM data is obtained at 60-CA intervals in the AFM data obtaining process, the obtained AFM data is stored one set after the other into the 60-CA buffer in the ECU 200 at 60-CA intervals. Three sets of AFM data are used to calculate an average.

Next, as the number of engine revolutions rises, and the crank angle intervals are switched from 60 CA to 90 CA, variations could occur in the AFM data averages as mentioned earlier if two sets of data, or the AFM data [Db3] in the 60-CA buffer and the AFM data [Dc1] in the 90-CA buffer, are used to calculate an average. Accordingly, in this example, the AFM data on which linear interpolation has been performed is used to calculate an average, instead of using the AFM data [Db3] in the 60-CA buffer.

Specifically, the AFM data (that is not actually obtained) for the crank angle (=270° CA in the example shown in FIG. 10) that is 90 CA prior to switching of the CA intervals is calculated by linear interpolation using two sets of AFM data [Db2] and [Db3] obtained at 60-CA intervals before and after that crank angle. The calculated AFM data [Dc2] and the AFM data [Dc1] obtained at 90-CA intervals are used to calculate an average. This process, when carried out upon switching from 60 CA to 90 CA, enables calculation of an average using the AFM data obtained at 90-CA intervals. The process reduces variations in the AFM data averages. This average flow rate calculating process for a CA interval switching is implemented only in the cycle of intake air pulsation in which the switching occurs.

A similar process reduces variations in the AFM data averages, for example, when the crank angle intervals are switched from 90 CA to 120 CA, when the crank angle intervals are switched from 120 CA to 90 CA, and when the crank angle intervals are switched from 90 CA to 60 CA.

The process described in "Average calculating process: Example 2" above is an equivalent of "a value obtained by linear interpolation from two sampling values obtained with the pre-switching value of the crank angle intervals and a sampling value obtained with the post-switching value of the crank angle intervals are used to calculate the average" in accordance with the present invention.

Effects

As described so far, according to the present embodiment, processes are carried out at an angular cycle equal to the pulsation cycle of intake air pulsation, and the output signal (AFM signal) of the air flow meter 22 is sampled at equal intervals within a cycle of intake air pulsation. That eliminates adverse effects of intake air pulsation and reduces variations in AFM data averages (calculated average flow rates). Besides, the crank angle intervals at which the AFM data is obtained are increased when the number of engine revolutions (rotational speed of the crankshaft) is relatively large in comparison with when the number of engine revolutions is relatively small. Therefore, the processing workload (computing workload) of the ECU 200 does not increase when the number of engine revolutions is relatively large.

As the crank angle intervals at which the AFM data is obtained is increased, the calculation precision in calculating the average of AFM data tends to fall. However, when the number of engine revolutions is in high revolution region, the intake air pulsation cycle becomes shorter, and the output signal (AFM signal) of the air flow meter 22 is moderated (the amplitude of the intake air pulsation decreases). Therefore, the output signal of the air flow meter 22 approaches the average in comparison with when the number of engine revolutions is in low revolution region. Therefore, errors are less likely even if the crank angle intervals at which the AFM data is obtained is increased.

As described here, the present embodiment reduces variations in AFM data averages (calculated average flow rates) without increasing the computing workload of the ECU 200 and without sacrificing response of the control.

Other Embodiments

The embodiments above have described the present invention as it is applied to an intake air volume measuring process for 4-cylinder diesel engines. The present invention is by no means limited to these embodiments and may be applied to, for example, an intake air volume measuring process for 6-cylinder diesel engines as well as for diesel engines with any other number of cylinders.

In addition, the embodiments above have described examples of the intake air volume measuring process for diesel engines. The present invention is by no means limited to these examples and may be applied to, for example, intake air volume measuring processes for gasoline and any other internal combustion engines.

INDUSTRIAL APPLICABILITY

The present invention is applicable to an intake air volume measuring device for an internal combustion engine (engine). To describe it in more detail, the present invention is effectively applicable to an intake air volume measuring device for an internal combustion engine, the device measuring an intake air volume based on the output signal of an air flow meter located in an intake air path of the internal combustion engine.

REFERENCE SIGNS LIST

1 Engine (Internal Combustion Engine)
11 Intake Air Path
22 Air Flow Meter
25 Crank Position Sensor
200 ECU

The invention claimed is:

1. An intake air volume measuring device for an internal combustion engine,
   said device comprising an air flow meter located in an intake air path of the internal combustion engine, to measure a volume of intake air sucked into a combustion chamber of the internal combustion engine based on an output signal of the air flow meter, and
   the output signal of the air flow meter being sampled in synchronism with a crank angle of the internal combustion engine,
   wherein an average of sets of data obtained by sampling the output signal of the air flow meter in synchronism with a crank angle of the internal combustion engine is calculated to obtain an average flow rate of the intake air,
   wherein the crank angle intervals, at which the output signal of the air flow meter is sampled, are switched according to the number of engine revolutions of the internal combustion engine,
   wherein the crank angle intervals are set to a greater value for a relatively large number of engine revolutions of the internal combustion engine than for a relatively small number of engine revolutions of the internal combustion engine, and
   wherein when the crank angle intervals are to be switched, if the crank angle intervals have a pre-switching value and a post-switching value such that either one of the pre-switching and post-switching values is a multiple of the other, sampling values obtained with a greater one of the pre-switching and post-switching values are used to calculate the average.

2. The intake air volume measuring device as set forth in claim 1, wherein the output signal of the air flow meter is sampled in synchronism with a crank angle of the internal combustion engine at predetermined crank angle intervals.

3. The intake air volume measuring device as set forth in claim 2, wherein the crank angle intervals are equal to 360° divided by an integer greater than or equal to 2 and are not equal to a crank angle corresponding to a cycle of the internal combustion engine divided by the number of cylinders of the internal combustion engine.

4. An intake air volume measuring device for an internal combustion engine,
   said device comprising an air flow meter located in an intake air path of the internal combustion engine, to measure a volume of intake air sucked into a combustion chamber of the internal combustion engine based on an output signal of the air flow meter, and
   the output signal of the air flow meter being sampled in synchronism with a crank angle of the internal combustion engine,
   wherein an average of sets of data obtained by sampling the output signal of the air flow meter in synchronism with a crank angle of the internal combustion engine is calculated to obtain an average flow rate of the intake air,
   wherein the crank angle intervals, at which the output signal of the air flow meter is sampled, are switched according to the number of engine revolutions of the internal combustion engine,
   wherein the crank angle intervals are set to a greater value for a relatively large number of engine revolutions of the internal combustion engine than for a relatively small number of engine revolutions of the internal combustion engine, and
   wherein when the crank angle intervals are to be switched, if the crank angle intervals have a pre-switching value and a post-switching value such that neither one of the pre-switching and post-switching values is a multiple of the other, a value obtained by linear interpolation from two sampling values obtained with the pre-switching value of the crank angle intervals and a sampling value obtained with the post-switching value of the crank angle intervals are used to calculate the average.

5. The intake air volume measuring device as set forth in claim 4, wherein the output signal of the air flow meter is sampled in synchronism with a crank angle of the internal combustion engine at predetermined crank angle intervals.

6. The intake air volume measuring device as set forth in claim 5, wherein the crank angle intervals are equal to 360° divided by an integer greater than or equal to 2 and are not equal to a crank angle corresponding to a cycle of the internal combustion engine divided by the number of cylinders of the internal combustion engine.

* * * * *